United States Patent [19]

Baumann

[11] 4,280,910

[45] Jul. 28, 1981

[54] METHOD AND APPARATUS FOR CONTROLLING AERATION IN BIOLOGICAL TREATMENT PROCESSES

[76] Inventor: Edward J. Baumann, 3109 Walden Ct., Columbus, Ohio 43220

[21] Appl. No.: 128,535

[22] Filed: Mar. 10, 1980

[51] Int. Cl.³ .............................................. C02F 3/16
[52] U.S. Cl. .................................. 210/614; 210/742; 210/96.1; 210/103
[58] Field of Search ................. 210/12, 15, 7, 14, 149, 210/96.1, 195.3, 103, 614, 742; 71/9

[56] References Cited

U.S. PATENT DOCUMENTS

| | | | |
|---|---|---|---|
| 3,138,447 | 6/1964 | Eweson | 71/9 |
| 3,342,727 | 9/1967 | Bringle | 210/15 |
| 3,426,899 | 2/1969 | Smith | 210/96.1 |
| 3,558,255 | 1/1971 | Rose | 210/96.1 |
| 4,062,770 | 12/1977 | Kneer | 210/149 |
| 4,130,481 | 12/1978 | Chase et al. | 210/96.1 |

FOREIGN PATENT DOCUMENTS 2905347  9/1979  Fed. Rep. of Germany ............. 210/15

OTHER PUBLICATIONS

"Water Treatment Handbook"; Degremont; pp. 702–713, (1973).

*Primary Examiner*—Benoît Castel
*Attorney, Agent, or Firm*—Robert B. Watkins

[57] ABSTRACT

A method and apparatus is provided for optimizing the efficiency of a biological process of treating waste and sewage, and more particularly a process in which air is supplied to the waste to adjust the dissolved oxygen content thereof to a desired optimum level. The process includes controlling the amount of air supplied to the process by adjusting the air supply means in the process in accordance with the ambient temperature of the air into the air supply means in combination with other air volume control means which are dependent on other process variables. The invention enables attainment of optimum concentrations of dissolved oxygen with minimum consumption of power and energy.

13 Claims, 4 Drawing Figures

METHOD AND APPARATUS FOR CONTROLLING AERATION IN BIOLOGICAL TREATMENT PROCESSES

SUMMARY OF THE INVENTION

This invention relates to a biological process of treating waste or sewage and, more particularly to a process in which air is supplied to the waste or sewage to adjust the dissolved oxygen content thereof to a desired optimum level. There are various forms of the biological process of treating waste including activated sludge methods as well as settling pond methods, and others. Those skilled in the art will see the application of this invention to the processes where it can be used to advantage.

In the activated sludge process of treating waste or sewage, the raw sewage or the effluent from a primary clarifier tank is usually passed through a treatment tank, known as an aeration tank or basin, and therein subjected to oxygenation by agitating the same in the presence of air. The organic materials in the waste or sewage are decomposed aerobically by bacteria contained in a biologically active floc.

As used herein the terms waste and sewage are used interchangeably since the activated sludge process is often used for treatment of waste of many kinds, and very often the treatment of sewage. Thus the terms are in many ways synonymous.

When sewage is agitated in the presence of oxygen, from the air, a sludge floc is formed from the sewage particles. Billions of bacteria and other small living organisms develop on this sludge floc. The sludge floc itself becomes active in the absorbing and oxidizing of the organic matter contained in the sewage. Hence, the sludge is called "activated sludge". When the sludge is in the right condition, it and its load of microscopic life can settle rapidly and take with it nearly all of the suspended solids in the sewage, and much of the solids in the colloidal state. The sludge floc is maintained by returning into the sewage a portion of the sludge from the end of the process. The combined sewage and returned sludge in the aeration tank is called "mixed liquor". The mixture is agitated and mixed with air, during which time the flocculation, absorption and oxidation of the suspended and colloidal organic matter, and some of the matter in solution, takes place. The mixture of sewage and sludge passes from the aeration tank or basin into a final settling tank where the activated sludge floc settles out. The effluent remaining is a relatively clear liquid with very little organic material therein.

In order to carry out the above described process, air is supplied to the aeration tank under pressure sufficient to agitate and bubble through the mixed liquor. The pressurized air is supplied by one or more well known air compressor means such as: a rotary positive displacement air compressor, (such as a CORD Blower manufactured by Cord Industrial Equipment, Ltd., Toronto, Ontario, Canada): a centrifical air compressor, (such as manufactured by Spencer Turbine Co. of Hartford, Conn. and such as that shown in U.S. Pat. No. 3,342,727): or a mechanical surface aerator such as that shown in U.S. Pat. No. 3,426,899. These kinds of air supply means will supply a weight of air which varies dependent upon several independent variables. The independent variables having an effect on the weight of air supplied are, the speed or rotation of the vanes or lobes in the compression chamber, the size of the inlet, the pressure of the system into which air is being supplied, the relative humidity of the ambient air at the inlet to the equipment, the pressure condition of the ambient air at the inlet, and the temperature of the ambient air at the inlet.

In the aeration process of a sewage treatment system, the amount of oxygen brought into contact with the sewage and absorbed by the sewage is a factor which determines the efficiency of the chemical-biological process involved. When the system is operating at maximum chemical reaction efficiency, the overall efficiency of the total process, apparatus, and plant is optimized by accomplishing this result with the least energy externally applied thereto. External energy is applied in the form of electrical power to operate the air compressors, the sewage sludge pumps, and water or chemical treatment pumps, etc. Other forms of energy may be supplied such as that from auxiliary gasoline or diesel engines.

While the prior art discloses the sense of controlling the activated sludge process according to the required levels of dissolved oxygen by varying the amount of air supplied in accordance with that dissolved oxygen, and dependent upon that demand, accomplishing this by varying the speed of the blowers, this invention combines a new control operational parameter with the control systems for activated sludge treatment plants. in the operation of the control system of this invention the speed of the air supply means and therefore the amount of oxygen supplied, is varied dependent upon the ambient temperature of the inlet air.

It is a primary object of this invention to provide a new and unique automatic control operation and system for optimizing the waste water treatment process by reducing the energy requirements towards only that necessary to efficiently carry out the aeration process. Another object of the invention is to provide an improvement in control systems for waste water treatment plants that will more precisely control the process. A further object of the invention is to provide an improvement in control operation and systems for waste water treatment plants which may be added to existing plants to improve their efficiency of operation and reduce their energy requirements as well as operating costs.

DETAILED DESCRIPTION OF THE INVENTION

Figure 1:
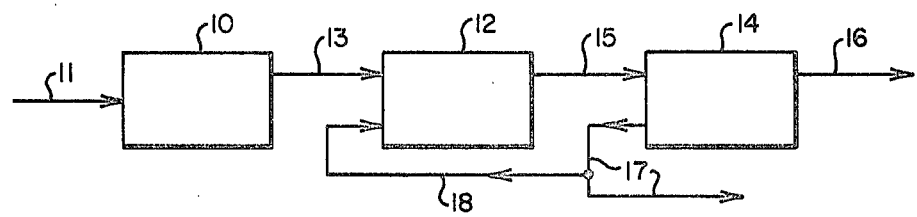
FIG. 1 is a schematic diagram of an activated sludge sewage treatment system and plant.

Referring to FIG. 1 sewage enters a first clarifier tank 10 through inlet 11. In the clarifier tank scrum and floating solids are skimmed from the surface of the sewage by means not shown. The sewage is then passed into an aeration basin 12 through an inlet 3. In the basin 12 air is introduced into the fluid sewage and aerobic decomposition takes place. Activated sludge is passed from basin 12 into a settling tank 14 through an inlet 15. In the settling tank 14 the sludge settles, and the relatively clear effluent at the top is passed through an outlet 16 for further purification or use. Most of the sludge is pumped out of settling tank 14 through an outlet 17, while a portion of the sludge is recirculated back to the aeration basin 12 through a conduit 18. That portion of the sludge recirculated into basin 12 acts as a reservoir of biological matter, maintaining the biologically active process continuously.

Figure 2:
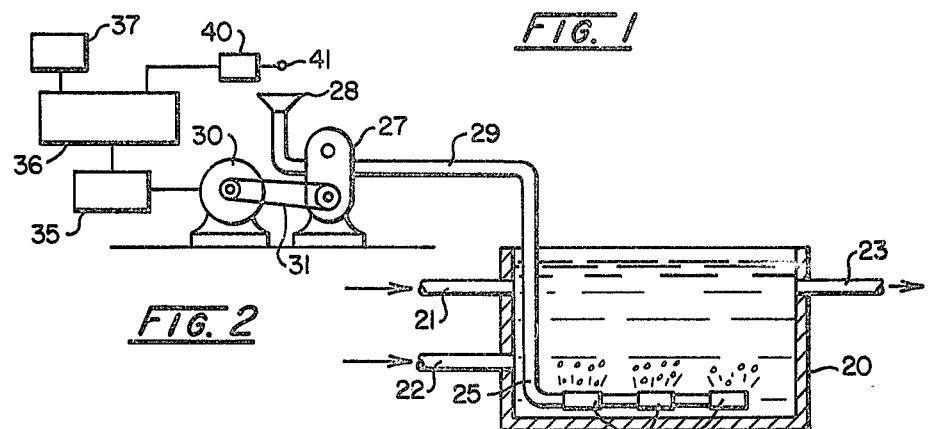
FIG. 2 is a cross sectional view through the areation basin with the electrical controls indicated schematically and the air supply equipment shown diagrammatically.

In FIG. 2 a form of aeration basin 20 is shown as having a sewage inlet 21, a sludge inlet 22 and an activated sludge outlet 23. Air supply piping 25 is provided having dispersing nozzles 26 disposed near the bottom of basin 20. An air supply means is shown as a rotary positive displacement air compressor 27 having an inlet 28 and a discharge line 29. Air compressor 27 is driven by a wound rotor electric motor 30 through belting or other means 31. A speed controller 35 is electrically connected to the motor 30. The speed controller is one which varies the current in the rotor windings of the motor and thus adjusts the speed of the motor.

Alternatively, motor 30 can be a standard induction motor. The speed controller 35 would then be a variable frequency type such as manufactured by Healv-Ruff Co. of St. Paul. Minn.

A control system to operate the aeration basin at optimum coditions under varying input parameters includes a control unit 36, a waste load signal generator 37, and an ambient air temperature sensor 40 with a probe 41.

Speed control unit 35 may comprise a rectifier bridge, connected to the rotor terminals of the wound rotor motor, which converts rotor AC current to DC. It is then filtered by a smoothing DC reactor and fe into a DC/AC converter. Here DC current is converted to 60 Hz AC current and returned to the AC supply line. The rotor current determines motor torque and depending on load conditions motor speed. Motor speed is thus regulated and controlled to satisfy process requirements. A typical speed control unit of this type is a ROTOR-MASTER Series 1800, manufactured by Healy-Ruff Company of St. Paul, Minn. U.S.

Control unit 36 comprises a logic system in which a variable input signal from one of the various inputs such as the waste load signal generator 37, and the ambient temperature sensor 40 is sent to a logic card which produces a control voltage or current signal to vary the speed of the motor.

A power factor correction capacitance may be applied to correct the system power factor to its optimum degree in each application. Typically in the 100-200 HP range at 1200-1800 RPM the power factor is corrected to 0.8 lagging at maximum speed. Power factor correction may be a part of motor speed control unit 35.

In a typical operation of the embodiment of FIG. 2, the waste load signal generator 37 may be a flow meter monitoring the sewage flow input line 11 or an oxygen uptake meter, monitoring the condition of the plant influent or effluent in tank 14, or a biological and/or chemical oxygen demand measuring device (a BOD meter) monitoring the biological-chemical constituency of the sewage in tank 10.

The ambient temperature sensor 40 is of a type to provide a continuous electrical control signal in accordance with and proportional to the ambient air temperature. Any deviation in ambient temperature from a normal 68° F. will control the amount of air introduced into the process by varying the speed of and output of the air compressor 27.

Each sewage treatment plant has design and/or actual optimum operating conditions in which all of the parameters of the variables are at their optimum for maximum efficiency. For instance, the dissolved oxygen content (DOCO) would be optimum at 2.0 PPM (parts per million). The dissolved oxygen content will remain at the DOCO so long as the chemical constituency of the sewage in coming to tank 10 remains the same and within the capabilities of the system and the oxygenation process continues with a constant air supply (by weight) from the diffusers 26.

When atmospheric air is utilized in the process, the weight of air per unit of volume is dependent upon its temperature, absolute pressure and relative humidity. Therefore, the quantity of oxygen per unit volume of air is dependent on these variables, since a fixed proportion of atmospheric air is oxygen. A volume of air in cubic feet at 68° F., 14.7 PSIA and 36% relative humidity is known as one standard cubic foot (SCF).

It has been found that the effect of relative humidity at a specific location can be neglected in most cases: and since the average barometric pressure at any particular location is controlled by the elevation above sea level and is therefore relatively constant, the change in weight of a cubic foot of air varies primarily with the ambient temperature of the air.

Since the relative humidity and barometric pressure may be ignored, variation in volume of a pound of air will be substantially linear in proportion to air temperature through the normal operating temperature ranges of a sewage treatment system and plant. A cubic foot of air weighs 0.075 lbs per cubic foot at 68° F. At 100° F. a cubic foot of air weights 0.0707 lbs.

Considering further the ideal and theoretical operating condition it will be apparent that the volume of air supply will remain constant only so long as the ambient air temperatures remain constant. Otherwise, because of the change in the density of air with temperature the weight of air will vary unless the speed of the compressor 27 is varied proportionately with the variation in air temperature. The most significant air temperature variation will occur at the inlet 28 where the temperature of the air will be subjected to ambient conditions in the vicinity of the plant. Obviously, in the wintertime the temperature of the inlet air will be much colder than the temperature of the inlet air in the summertime in most localities. Furher, in most localities the temperature of the inlet will vary significantly throughout the course of a 24 hour operating day. In order to provide the constant weight air volume required for DOCO operation, the temperature sensor 40 and its control signals are provided to the control unit 36.

In this invention a constant weight of air is optimally supplied in accordance with the load on the aeration process.

From the foregoing it will be seen that as the temperature of the air at the inlet 28 of the compressor 27 varies, a signal is provided to operate the control unit 36 which through its logic circuit provides a signal to the motor control unit 35 which changes the speed of the motor 30 and the compressor 27 to provide a constant weight of air and oxygen to a system which is operating at DOCO under a particular flow rate and chemical constituency condition.

The need to operate sewage treatment plants at optimum efficiency is now more than ever a requirement because of the increase in the cost of energy in the form of electrical or other power. In the past it has not generally been considered critically important to reduce the speed of electric motors as a means of reducing power consumption and consequently sewage treatment plants have tended to operate with excess oxygenation as a standard means of being certain that there is sufficient oxygen available for the process. With this invention the primary criteria of DOCO can be achieved with the least power requirements.

Recently, through modern solid state electronics, a highly efficient method of variable speed motor control, slip power recovery, has been made practical and dependable. The power loss wasted by other systems such as variable resistance in rotor circuits, is converted in the slip power recovery method to an AC current and returned to the AC supply line. This resuls in substantial electrical power savings in most motor speed control operations. The control of motor speed can also be accomplished with electrical variable frequency drives. The use of these types of variable speed motor controls further enhances the energy savings provided by this invention.

Figure 3:
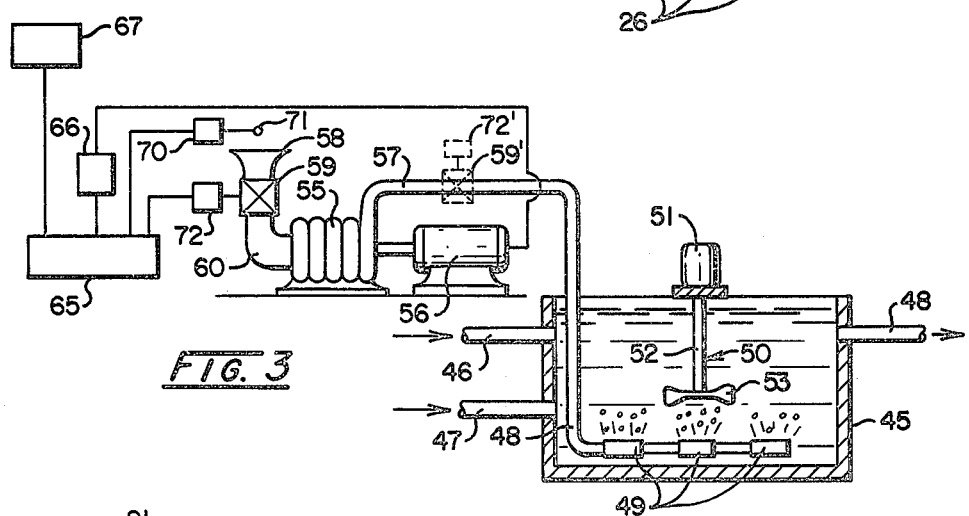
FIG. 3 is a cross sectional view through the areation tank with the electrical controls indicated schematically and another embodiment of air supply equipment shown diagrammatically.

Referring to FIG. 3, another embodiment of the invention is shown having an aeration basin 45 with a sewage inlet 46 and an activated sludge inlet 47 and an effluent outlet 48. Air is provided by air supply piping 48 and dispersing outlets 49. An agitator assembly 50 comprising a motor 51, shaft 52 and impeller blade 53 is provided to increase the contact between the air and the material in the basin.

A centrifugal air compressor 55 is driven by a variable speed electrical motor 56, providing air from the outlet 57 to the piping 48. An inlet 58 is connected through a throttling valve 59 to the intake 60 of the air compressor 55. Alternatively and in some applications the throttling valve 59 may be located in the outlet air supply line 57 (as shown in phantom in FIG. 3).

The control system of the embodiment shown in FIG. 3 includes a control unit 65, a motor speed control 66, a waste load indicator 67, and an ambient temperature sensor 70 with a probe 7. A throttling valve operation control means 72 or 72' is also connected into the control unit 65.

The operation of the embodiment of FIG. 3 is similar to that described for the operation of the embodiment of FIG. 2, except for the operation of the throttling valve 59 and 59'. Wasteload sensor 47 provides a control signal to the logic circuit of control unit 65. Responsive to the control signals from the wasteload sensor 67 the logic circuit provides gating signals to the motor speed controller 66 which in turn varies the speed of the compressor motor 56.

Under certain conditions when the BOD is greatly reduced calling for a drastic reduction in speed of motor 56 and the compressor 55 to a level less than acceptable efficiency, control of the volume of air provided through air piping 48 is reduced by throttling through the valve 59 and 59' by means of the throttle valve control 72, 72'. Throttling may be necessary because centrifugal compressors have a sharp drop off in efficiency when the speed is reduced below certain critical levels.

In order to deliver the weight of air and oxygen required for DOCO operations, air temperature sensor 70 provides a control signal to the control unit 65 in response to changes in ambient air temperatures at the probe 58.

Figure 4:
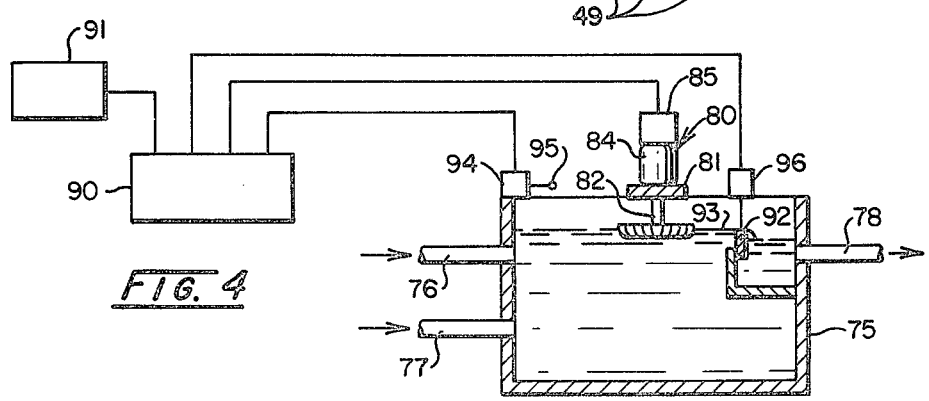
FIG. 4 is a cross sectional view through the aeration tank with the electrical controls indicated schematically and another embodiment of air supply equipment shown diagrammatically.

Another embodiment of the invention is shown in FIG. 4 in which an aeration basin 75 is provided. Aeration basin 75 has sewage inlet 76 and an activated sludge inlet 77. At the opposite side an activated sludge outlet 78 is provided. An aeration unit 80 including a support frame 81, drive shaft 82 and impeller 83 are driven by motor 84 with a speed control unit 85. An adjustable weir 92 provides a means of controlling the level of the surface 93 (the depth of immersion).

Rapid rotation of the impeller 83 at the surface of the material in the basin 75 provides a vortex of agitation and action between the air at the surface and the material in the basin. The speed of rotation and the depth of immersion of the impeller 83 will determine the amount of air and oxygen supplied to the activated sludge in the basin 75. The ambient temperature of the air will determine the weight of air supplied for any set speed and depth of immersion.

The control system of the embodiment shown in FIG. 4, includes a control unit 90, the motor speed control 85, a waste load indicator 91, a weir level adjuster 96, and an ambient temperature sensor 94 with a probe 95.

Operation of the embodiment of FIG. 4, is similar to that described for the embodiments of FIGS. 2 and 3. Waste load indicator 91 provides a control signal to the logic circuit of control unit 90. Dissolved oxygen sensor (not shown) provides a control signal to the control unit 90 as required for an increase or decrease in the dissolved oxygen content of the effluent passing through the outlet 78. Responsive to the control signals from the waste load indicator 91, and the dissolved oxygen sensor, the logic circuit provides gating signals to the motor speed controller 85, which in turn varies the speed of the impeller motor 84, and also may adjust the weir 92 by means of the adjuster 96.

In order to deliver the weight of air and oxygen required for DOCO operations, the air temperature sensor 94 provides a control signal to control unit 90 in response to changes in ambient air temperature at the surface of the material in basin 75.

The waste load on a sewage treatment plant usually varies with time, since it is obvious that the waste of a given community will be a random accumulation. Waste treatment plants at a factory or chemical plant may be more uniform. Normally the waste load will vary in quantity depending on the time in a 24 hour cycle. More waste will be disposed of in the daytime than at night, for example. The constituency will vary during a 24 hour cycle depending on the activities of people.

The waste load indicator in the apparatus of this invention may be either a flow meter, an oxygen uptake meter, or a biological and/or chemical oxygen demand measuring device which are well known for these purposes. Each of these will sense a revelant parameter of the waste load entering the sewage treatment system.

However, with ambient temperature sensors combined in the control system as revealed in this invention, waste load sensing may not be as necessary for optimum efficiency. In a system having the control combination of this invention, a waste load indicator signal may be generated from a memory, electronic or paper chart, which contains the average waste load data historically recorded in the system in the past. For instance, the waste load indicated signal at a given time on a certain day of the week may be a representation of the waste load of that time on previous similar days in the past. Use of this signal may be preferable when the plant is subject to rapidly changing flows with a short time between changes. Plants which experience these kinds of rapid fluctuations have some difficulty in adjusting since the sewage treatment process is one of slow reaction and change.

The control unit in the control system of this invention is constantly integrating the various control signals to provide a signal to the motor speed controller which is the algebraic sum of signals being generated by the various sensors and indicators.

Thus, it is possible that DOCO operation will allow an air supply motor slow-down, even though more oxygen is required because of an increasing waste load indicator. This could occur when the ambient temperature is falling rapidly. The improvement of this invention allows a reduction in energy demand, and saving, automatically.

Possible energy savings are of the order of forty percent with controlling the amount of air by varying it with the ambient temperature changes and waste load variations.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and the appended claims.

I claim:

1. In the biological treatment process for treating waste where air is introduced to the waste to affect aerobic decomposition thereof, the operations of controlling the process and maintaining the efficiency thereof comprising:
    (a) introducing air into the waste with air supply means,
    (b) measuring the waste load entering the process, and controlling the amount of air introduced by the air supply means into the waste, dependent upon the measured waste load, and
    (c) sensing the temperature of ambient air entering the air supply means, and controlling the amount of air supplied by the air supply means, dependent upon the sensed ambient temperature.

2. An activated sludge process according to claim 1 wherein the waste load measurement comprises: measuring the oxygen demand of the waste entering the process, and controlling the amount of air supplied by the air supply means, dependent upon the measured oxygen demand.

3. An activated sludge process according to claim 1 wherein the waste being treated is sewage.

4. An activated sludge process according to claim 1 wherein the amount of air introduced by the air supply means into the waste is controlled by varying the speed of the air supply means.

5. In an activated sludge process for treating waste, the operation of controlling the process and maintaining the efficiency thereof according to claim 1, wherein the amount of air introduced by the air supply means into the waste is controlled by throttling the intake of air into the air supply means.

6. In an activated sludge process for treating waste, the operations of controlling the process and maintaining the efficiency thereof according to claim 1, wherein the amount of air introduced by the air supply means into the waste is controlled by throttling the amount of air supplied at the outlet of the air supply means.

7. The system of controlling an activated sludge processing apparatus having an air supply means with an inlet for air comprising: first sensor means operable to provide a first electrical signal indicative of the waste load in the process, second sensor means operable to indicate the ambient temperature of the air entering the inlet of the air supply means by providing a second electrical signal indicative of the temperature of the air in the inlet, and control means to combine the first signal of the waste load signal sensing means and the second signal of the ambient temperature sensing means to algebraicaly sum the electrical signals received and to supply a third control signal to adjust the amount of air supplied by the air supply means.

8. The system for controlling an activated sludge process according to claim 7 wherein the quantity of waste load is indicated by memory means which provide the first electrical signal indicative of the historical quantity waste load of the system at the same time of day in the past as the flow is indicated in the present.

9. The system for controlling an activated sluge process according to claim 7 wherein the air supply means is a rotary positive displacement air compressor connected to an air diffusion supply means.

10. The system for controlling an activated sludge process according to claim 7 wherein the air supply means is a centrifugal air compressor connected to an air diffusion supply means.

11. The system for controlling an activated sludge process according to claim 7 wherein the air supply means is a rotary impeller at the surface of the waste flowing in the system.

12. The system for controlling an activated sludge process according to claim 11 wherein the second sensor means are located near the surface of the waste flowing in the system.

13. In a waste treatment plant having an aeration basin with a waste inlet, an outlet for treated waste and means for introducing air of potentially variable ambient temperature into the waste, the improvement comprising: variable speed means connected to the air introducing means for compressing air at a rate dependent upon the speed of the compressing means, and means connected to the compressing means for sensing the ambient temperature of the air entering the compressing means and for varying the speed of the compressing means dependent upon the variation in the ambient temperature of the entering air.

* * * * *